United States Patent [19]

Battershell

[11] 3,719,765

[45] March 6, 1973

[54] SUBSTITUTED TRIMESONITRILES FOR REGULATING PESTS ON PLANTS

[75] Inventor: Robert D. Battershell, Painesville, Ohio

[73] Assignee: Diamond Shamrock Corporation, Cleveland, Ohio

[22] Filed: Aug. 17, 1970

[21] Appl. No.: 64,587

Related U.S. Application Data

[62] Division of Ser. No. 772,052, Oct. 30, 1968, Pat. No. 3,637,796.

[52] U.S. Cl. ................................................424/304
[51] Int. Cl. ................................................A01n 9/20
[58] Field of Search ....................424/304; 260/465 E

[56] References Cited

UNITED STATES PATENTS

| | | | |
|---|---|---|---|
| 3,480,658 | 11/1969 | Rohr | 424/304 |
| 3,551,573 | 12/1970 | Baker et al. | 424/304 |
| 3,557,183 | 1/1971 | Ishiyama et al. | 424/304 |

*Primary Examiner*—Jerome D. Goldberg
*Attorney*—C. Thomas Cross, Roy Davis, Timothy E. Tinkler, Dick M. Warburton, John J. Freer, Sam E. Laub, Neal T. Levin, Leslie G. Nunn, Jr., Helen P. Brush and John C. Turman

[57] ABSTRACT

Substituted trimesonitriles are disclosed along with their preparation through reaction of chlorinated trimesonitrile with aniline and substituted anilines. The compounds disclosed herein are active as pesticides including fungicidal, viricidal and bactericidal applications.

4 Claims, No Drawings

SUBSTITUTED TRIMESONITRILES FOR REGULATING PESTS ON PLANTS

CROSS-REFERENCE TO RELATED APPLICATIONS

This application is a divisional application of Ser. No. 772,052, Robert D. Battershell, filed Oct. 30, 1968, now U.S. Pat. No. 3,637,796.

SUMMARY OF THE INVENTION

The present invention relates to compositions of matter consisting of compounds having the structure:

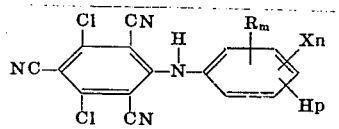

where R is an alkyl, halogenated alkyl, alkoxy, nitro, cyano, amino or hydroxyl radical; X is halogen and H is hydrogen with $m$, $n$ and $p$ varying between 0 and 5 with the sum of $m$, $n$ and $p$ equal to 5.

The invention also relates to the preparation of such compounds from 1,3,5-trichlorotrimesonitrile corresponding to the formula:

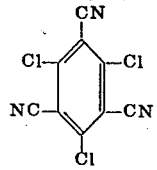

and a precursor corresponding to the formula:

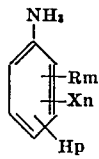

wherein R is an alkyl, halogenated alkyl, nitro, cyano, alkoxy, amino or hydroxyl radical; X is halogen and H is hydrogen with $m$, $n$ and $p$ varying between 0 and 5 with the sum of $m$, $n$ and $p$ equal to 5.

The invention further relates to biologically active compositions containing the compounds disclosed herein and further relates to methods of killing pests by contacting said pests with a pesticidal amount of said compound.

As used herein the terms "pesticide," "pesticidal" and "killing pests" are employed for convenience to refer to the killing and/or controlling of at least one growth such as undesirable fungus, virus or bacteria and thus "pesticidal compositions" can include compositions which are commonly known as bactericides, viricides, fungicides and the like.

DESCRIPTION OF THE PREFERRED EMBODIMENTS

This invention presents compositions of substituted trimesonitriles of the general formula:

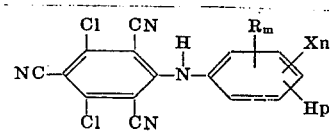

where R is an alkyl, halogenated alkyl, nitro, cyano, alkoxy, amino or hydroxyl radical; X is halogen and H is hydrogen with $m$, $n$ and $p$ varying between 0 and 5 with the sum of $m$, $n$ and $p$ equal to 5.

Also included in this invention are biologically active compositions containing compounds of the foregoing general formula as the essential active ingredient present in an amount sufficient to exert biological activity.

Structures illustrative of the compounds of this invention are:

2,4-Dichloro-6-(anilino)-Trimesonitrile

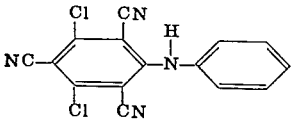

2,4-Dichloro-6-(o-chloroanilino)-Trimesonitrile

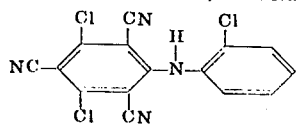

2,4-Dichloro-6-(p-bromoanilino)-Trimesonitrile

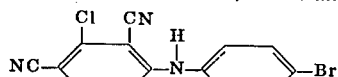

2,4-Dichloro-6-(p-hydroxyanilino)-Trimesonitrile

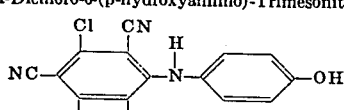

2,4-Dichloro-6-(p-aminoanilino)-Trimesonitrile

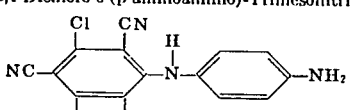

2,4-Dichloro-6-(2,4-dimethylanilino)-Trimesonitrile

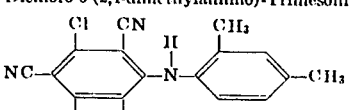

2,4-Dichloro-6-(3,4-dimethoxyanilino)-Trimesonitrile

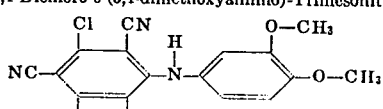

2,4-Dichloro-6-(o-bromoanilino)-Trimesonitrile

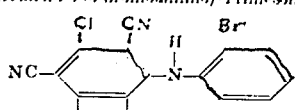

.4-Dichloro-6-(2,3-dimethylanilino)-Trimesonitrile

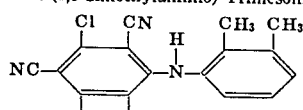

2,4-Dichloro-6-(2,3-dichloroanilino)-Trimesonitrile

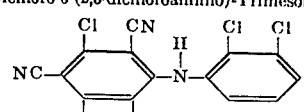

2,4-Dichloro-6-(o-hydroxyanilino)-Trimesonitrile
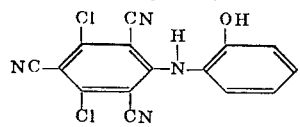

2,4-Dichloro-6-(m-chloroanilino)-Trimesonitrile
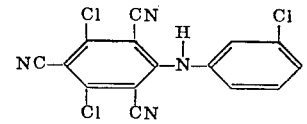

2,4-Dichloro-6-(p-chloroanilino)-Trimesonitrile
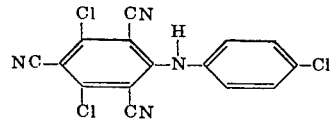

2,4-Dichloro-6-(2,4-difluoroanilino)-Trimesonitrile
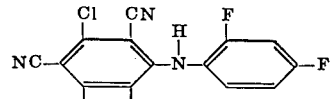

2,4-Dichloro-6-(o-ethylanilino)-Trimesonitrile
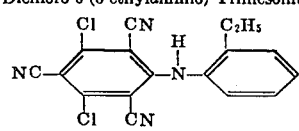

2,4-Dichloro-6-(3-chloro-2-methylanilino)-Trimesonitrile
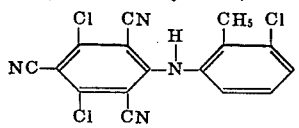

2,4-Dichloro-6-(3-fluoroanilino)-Trimesonitrile
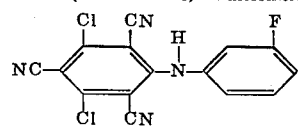

2,4-Dichloro-6-(3-trifluoromethylanilino)-Trimesonitrile
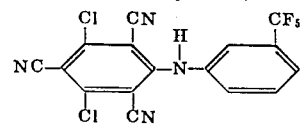

2,4-Dichloro-6-(3,4-dichloroanilino)-Trimesonitrile
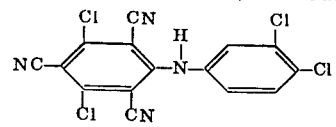

2,4-Dichloro-6-(2-iodoanilino)-Trimesonitrile
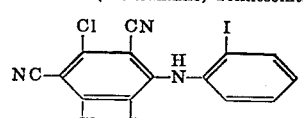

2,4-Dichloro-6-(2,4,5-trichloroanilino)-Trimesonitrile
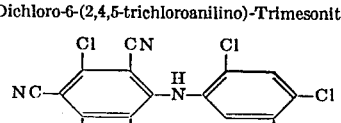

2,4-Dichloro-6-(2,4,5-trimethylanilino)-Trimesonitrile
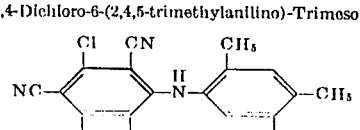

2,4-Dichloro-6-(2-chloro-4,5-dimethylanilino)-Trimesonitrile
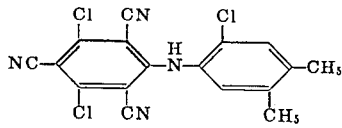

2,4-Dichloro-6-(2-nitro-4,5-dimethylanilino)-Trimesonitrile
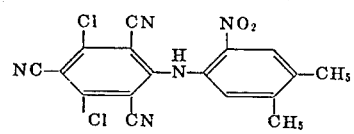

2,4-Dichloro-6-(2-methyl-3-nitroanilino)-Trimesonitrile
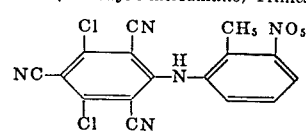

2,4-Dichloro-6-(2-cyanoanilino)-Trimesonitrile
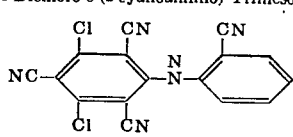

While it is possible to apply the compounds in undiluted form to the plant or other material to be protected, it is frequently desirable to apply them in admixture with either solid or liquid inert adjuvants. Thus, they can be applied to the plants for fungicidal purposes, for example, by spraying the plants with aqueous or organic solvent dispersions of the compound. Similarly, wood surfaces can be protected by applying a protective film of the compound by brushing, spraying or dipping utilizing a liquid dispersion thereof. The choice of an appropriate solvent is determined largely by the concentration of active ingredient which it is desired to employ, by the volatility required in a solvent, the cost of the solvent and the nature of the material being treated. Among the many suitable organic solvents which can be employed as carriers for the present pesticides, there may be mentioned hydrocarbons such as benzene, toluene, xylene, kerosene, diesel oil, fuel oil and petroleum naphtha; ketones such as acetone, methyl ethyl ketone and cyclohexanone; chlorinated hydrocarbons such as carbon tetrachloride, chloroform, trichloroethylene and perchloroethylene; esters such as ethyl acetate, amyl acetate and butyl acetate; the monoalkyl ethers of ethylene and diethylene glycol, e.g., the monomethyl or monoethyl ethers; alcohols such as ethanol, isopropanol and amyl alcohol; and the like.

The pesticidal compounds can also be applied to plants and other materials along with inert solid adjuvants or carriers such as talc, pyrophyllite, Attaclay, kieselguhr, chalk, diatomaceous earth, lime, calcium carbonate, bentonite, fuller's earth, cottonseed hulls, wheat flour, soybean flour, pumice, tripoli, wood flour, walnut shell flour and lignin.

It is frequently desirable to incorporate a surface active agent in the pesticidal compositions of this invention. Such surface active agents are advantageously employed in both the solid and liquid compositions. The surface active agent can be anionic, cationic or nonionic in character.

Typical classes of surface active agents include alkyl sulfonates, alkylaryl sulfonates, alkyl sulfates, alkylamide sulfonates, alkylaryl polyether alcohols, fatty acid esters of polyhydric alcohols, ethylene oxide addition products of such esters, addition products of long chain mercaptans and ethylene oxide, sodium alkyl benzene sulfonates having 14 to 18 carbon atoms, alkylphenolethylene oxides, e.g., p-isooctylphenol condensed with 10 ethylene oxide units; and soaps, e.g., sodium stearate and sodium oleate.

The solid and liquid formulations can be prepared by any suitable method. Thus, the active ingredients, in finely divided form if a solid, may be tumbled together with finely divided solid carrier. Alternatively, the active ingredient in liquid form, including solutions, dispersions, emulsions and suspensions thereof, may be admixed with the finely divided solid carrier in amounts small enough to preserve the free-flowing property of the final dust composition.

When solid compositions are employed, in order to obtain a high degree of coverage with a minimum dosage of the formulation, it is desirable that the formulation be in finely divided form. The dust containing an active compound as described above usually should be sufficiently fine that substantially all will pass through a 20-mesh Tyler sieve. A dust which passes through a 200-mesh Tyler sieve also is satisfactory.

For dusting purposes, preferably formulations are employed in which the active ingredient is present in an amount of 5 to 10 percent of the total by weight. However, concentrations outside this range are operative and compositions containing from 1 to 99 percent of active ingredient by weight are contemplated, the remainder being carrier and/or any other additive or adjuvant material which may be desired. It is often advantageous to add small percentages of surface active agents, e.g., 0.5 to 1 percent of the total composition by weight, to dust formulations.

For spray application, the active ingredient may be dissolved or dispersed in a liquid carrier, such as water or other suitable liquid. The active ingredient can be in the form of a solution, suspension, dispersion or emulsion in aqueous or nonaqueous medium. Desirably, 0.5 to 1.0 percent by weight of a surface active agent is included in the liquid composition.

For adjuvant purposes, any desired quantity of surface active agent may be employed, such as up to 250 percent of the active ingredient by weight. If the surface active agent is used only to impart wetting qualities, for example, to the spray solution, as little as 0.05 percent by weight or less of the spray solution need be employed. The use of larger amounts of surface active agent is not based upon wetting properties but is a function of the physiological behavior of the surface active agent. These considerations are particularly applicable in the case of the treatment of plants. In liquid formulations the active ingredient often constitutes not over 30 percent by weight of the total and may be 10 percent, or even as low as 0.01 percent.

The pesticidal compounds of the present invention can be employed in compositions containing other pesticides, more especially fungicides, insecticides and bactericides, e.g., phenothiazine, pyrethrum, rotenone, DDT, etc.

In order that those skilled in the art may more completely understand the present invention and the preferred embodiments by which the same may be carried into effect, the following specific examples are offered.

EXAMPLE 1

Preparation of 2,4-dichloro-6-(2-chloroanilino)-trimesonitrile

To a solution of 6.45 grams (0.025 mol) of trichlorotrimesonitrile in dimethyl sulfoxide at room temperature was added a solution of 7.05 grams (0.055 mol) of o-chloroaniline in dimethyl sulfoxide. After all of the aniline was added, the reaction mixture was stirred for 3 hours at around 70° C. At this time analysis of the reaction mixture by thin layer chromatography showed the reaction to be complete. The mixture was diluted with about 3 volumes $H_2O$ causing a yellow precipitate to form. The resulting 5.3 grams of crude product were recrystallized from benzene to give 4.3 grams of product melting at 193.5° to 194.5° C. and having the following analysis:

|  | Calculated | Found |
|---|---|---|
| Carbon | 51.7 | 52.1 |
|  |  | 52.3 |
| Hydrogen | 1.4 | 2.3 |
|  |  | 1.9 |
| Chlorine | 30.8 | 30.6 |
| Nitrogen | 16.1 | 16.1 |

EXAMPLES 2–9

Preparation of Other Substituted Trimesonitriles

Using the equipment and procedure described in Example 1, the reactants noted in the following Table 1 are reacted substantially according to the teachings of Example 1.

EXAMPLE 10

Preparation of 2,4-dichloro-6-(4-hydroxyanilino)-trimesonitrile

To a solution of 12.9 grams (0.05 mol) of trichlorotrimesonitrile in acetone at room temperature was added an acetone solution of 11.9 grams (0.11 mol) of 4-hydroxyaniline. After all of the aniline had been added, the reaction mixture was stirred for 4 hours at room temperature. Analysis of the reaction mixture by thin layer chromatography showed the reaction to be complete. The mixture was diluted with 3 volumes of $H_2O$ causing a yellow precipitate to form. The resulting 16.0 grams of crude product were recrystallized from methanol to give 12.0 grams of product melting at 284° to 286° C. and having the following analysis:

|  | Calculated | Found |
|---|---|---|
| Carbon | 54.7 | 54.8 |
| Hydrogen | 1.8 | 3.1 |
| Chlorine | 21.6 | 20.5 |

EXAMPLES 11–19

Preparation of Other Substituted Trimesonitriles

Using the equipment and procedure described in Example 10, the reactants noted in the following Table 2 are reacted substantially according to the teaching of Example 10.

TABLE 1

| Example | Reactants | Product | Melting point, °C | Calculated C | H | Cl | N | Found C | H | Cl | N |
|---|---|---|---|---|---|---|---|---|---|---|---|
| 2 | Trichlorotrimesonitrile and 2,4-dimethylanilino. | 2,4-dichloro-6-(2,4-dimethylanilino)-trimesonitrile. | 217–219 | 59.8 | 2.9 | 20.8 | 16.4 | 60.5 | 3.4 | 20.7 | 16.8 |
| 3 | Trichlorotrimesonitrile and 2-bromoaniline. | 2,4-dichloro-6-(2-bromoanilino)-trimesonitrile. | 196.5–197.5 | 46.0 | 1.3 | 18.1 | 14.3 | 46.1 | 1.3 | 18.2 | 14.3 |
| 4 | Trichlorotrimesonitrile and 2,3-dimethylaniline. | 2,4-dichloro-6-(2,3-dimethylanilino)-trimesonitrile. | 233–234 | 59.8 | 3.0 | 20.8 | 16.4 | 60.0 | 3.6 | 21.4 | 16.5 |
| 5 | Trichlorotrimesonitrile and 2,3-dichloroaniline. | 2,4-dichloro-6-(2,3-dichloroanilino)-trimesonitrile. | 211–214 | 47.2 | 1.1 | 37.1 | 14.7 | 46.7 | 1.8 | 36.8 | 13.8 |
| 6 | Trichlorotrimesonitrile and 2-hydroxyaniline. | 2,4-dichloro-6-(2-hydroxyanilino)-trimesonitrile. | 250–251.5 | 54.7 | 1.8 | | | 54.9 | 2.6 | 21.5 | |
| 7 | Trichlorotrimesonitrile and 2,4-difluoroaniline. | 2,4-dichloro-6-(2,4-difluoroanilino)-trimesonitrile. | 237–238 | 51.6 | 1.2 | 20.3 | 16.0 | 51.4 | 1.8 | 20.2 | 16.7 |
| 8 | Trichlorotrimesonitrile and 2-ethylaniline. | 2,4-dichloro-6-(2-ethylanilino)-trimesonitrile. | 190–193 | 59.8 | 3.0 | | 16.4 | 60.4 | 3.2 | | 16.7 |
| 9 | Trichlorotrimesonitrile and 3-chloro-2-methylaniline. | 2,4-dichloro-6-(3-chloro-2-methylanilino)-trimesonitrile. | 217–220 | 53.1 | 2.0 | 29.4 | 15.5 | 53.2 | 2.0 | 29.9 | 15.9 |

TABLE 2

| Example | Reactants | Product | Melting point, °C | Calculated C | H | Cl | N | Found C | H | Cl | N |
|---|---|---|---|---|---|---|---|---|---|---|---|
| 11 | Trichlorotrimesonitrile and aniline. | 2,4-dichloro-6-(anilino)-trimesonitrile. | 241–242 | 57.5 | 1.9 | | 17.9 | 58.1 | 2.8 | | 17.7 |
| 12 | Trichlorotrimesonitrile and 4-bromoaniline. | 2,4-dichloro-6-(4-bromoanilino)-trimesonitrile. | 332–333 | 45.9 | 1.3 | | 14.3 | 46.7 | 2.3 | | 13.6 |
| 13 | Trichlorotrimesonitrile and 4-phenylenediamine. | 2,4-dichloro-6-(4-aminoanilino)-trimesonitrile. | (¹) | 55.0 | 2.0 | 21.6 | 21.4 | 55.5 | 2.6 | 21.9 | 21.1 |
| 14 | Trichlorotrimesonitrile and 3,4-dimethoxyaniline. | 2,4-dichloro-6-(3,4-dimethoxyanilino)-trimesonitrile. | 238–239 | 54.7 | 2.7 | 19.0 | 15.0 | 54.7 | 3.6 | 19.8 | 15.0 |
| 15 | Trichlorotrimesonitrile and 3-chloroaniline. | 2,4-dichloro-6-(3-chloroanilino)-trimesonitrile. | 226–227 | 51.8 | 1.5 | 30.6 | 16.1 | 51.8 | 1.8 | 30.6 | 15.6 |
| 16 | Trichlorotrimesonitrile and 4-chloroaniline. | 2,4-dichloro-6-(4-chloroanilino)-trimesonitrile. | 310–311 | 51.8 | 1.4 | 30.6 | 16.1 | 52.2 | 1.6 | 30.3 | 15.9 |
| 17 | Trichlorotrimesonitrile and 3-fluoroaniline. | 2,4-dichloro-6-(3-fluoroanilino)-trimesonitrile. | 244–245 | 54.4 | 1.5 | 21.4 | 16.9 | 55.0 | 1.7 | 21.8 | 16.9 |
| 18 | Trichlorotrimesonitrile and 3-trifluoromethylaniline. | 2,4-dichloro-6-(3-trifluoromethylanilino)-trimesonitrile. | 263–265 | 50.4 | 1.3 | 18.6 | 14.7 | 51.0 | 1.4 | 18.7 | 14.7 |
| 19 | Trichlorotrimesonitrile and 3,4-dichloroaniline. | 2,4-dichloro-6-(3,4-dichloroanilino)-trimesonitrile. | 250–251 | 47.2 | 1.1 | 37.1 | 14.7 | 48.1 | 1.6 | 37.3 | 14.7 |

¹ Decomposes at 450° C.

EXAMPLE 20

Foliage Protectant and Eradicant Tests

The tomato foliage disease test measures the ability of the test compound to protect tomato foliage against infection by early blight fungus *Alternaria solani* (Ell. and Mart.) Jones and Grout and the late blight fungus *Phytophthora infestans* (Mont.) deBary. The method used employs tomato plants, 5 to 7 inches high which are 4 to 6 weeks old. Duplicate plants, one set for each test fungus, are sprayed with various dosages of the test formulation at 40 lbs./sq. in. air pressure while being rotated on a turntable in a hood. The center of the turntable is 45 inches from the nozzle of the spray gun. The test formulation containing the test compound, acetone, stock emulsifier solution and distilled water is applied at concentrations up to 1,000 p.p.m. of the test chemical. Lower concentrations of toxicant are obtained by employing less toxicant and more water, thereby maintaining the same concentration of acetone and emulsifier.

After the spray deposit is dry, treated plants and controls (sprayed with formulation less toxicant) are sprayed while being rotated on a turntable with a spore suspension containing approximately 20,000 conidia of *A. solani* per ml., or 150,000 sporangia of *P. infestans* per ml. The atomizer used delivers 20 ml. in the 30-second exposure period. The plants are held in a saturated atmosphere for 24 hours at 70° F. for early blight and 60° F. for late blight to permit spore germination and infection before removal to the greenhouse. After 2 days from the start of the test for early blight and 3 days for late blight, lesion counts are made on the 3 uppermost fully expanded leaves. The data are converted to percent disease control based on the number of lesions obtained on the control plants. Dosages and percent disease control are given in the following table:

| Compound | Dosage (p.p.m.) | % Disease Control E. Blight | L. Blight |
|---|---|---|---|
| 2,4-Dichloro-6-(o-chloroanilino)-trimesonitrile | 256 | 100 | 100 |
| | 128 | 98 | 100 |
| | 64 | 83 | 98 |
| | 32 | 63 | 97 |
| | 16 | 40 | 98 |
| | 8 | 17 | 87 |
| 2,4-Dichloro-6-(p-hydroxyanilino)-trimesonitrile | 128 | 100 | 100 |
| | 64 | 90 | 99 |
| | 32 | 83 | 99 |
| | 16 | 47 | 96 |
| | 8 | 24 | 83 |
| 2,4-Dichloro-6-(p-bromoanilino)-trimesonitrile | 1000 | | 98 |
| 2,4-Dichloro-6-(anilino)-trimesonitrile | 1000 | | 100 |
| 2,4-Dichloro-6-(p-aminoanilino)-trimesonitrile | 1000 | | 100 |
| 2,4-Dichloro-6-(m-chloroanilino)-trimesonitrile | 128 | 99 | 100 |
| | 64 | 95 | 98 |
| | 32 | 85 | 97 |
| | 16 | 77 | 95 |
| | 8 | 63 | 77 |
| 2,4-Dichloro-6-(p-chloroanilino)-trimesonitrile | 128 | 94 | 100 |
| | 64 | 81 | 71 |
| | 32 | 46 | 53 |
| | 16 | 24 | 7 |
| | 8 | 8 | 0 |
| 2,4-Dichloro-6-(3-chloro-2-methylanilino)- | 128 | 95 | 92 |
| | 64 | 72 | 90 |

| Compound | Concentration (p.p.m.) | E.a. | X.p. | S.a. | E.c. |
|---|---|---|---|---|---|
| trimesonitrile | 32 | 67 | | 84 | |
| | 16 | 62 | | 79 | |
| | 8 | 29 | | 64 | |
| 2,4-Dichloro-6-(2,4-difluoroanilino)-trimesonitrile | 128 | 99 | | 100 | |
| | 64 | 71 | | 95 | |
| | 32 | 60 | | 90 | |
| | 16 | 37 | | 73 | |
| | 8 | 13 | | 58 | |
| 2,4-Dichloro-6-(2,3-dichloroanilino)-trimesonitrile | 64 | 100 | | 100 | |
| | 32 | 93 | | 99 | |
| | 16 | 90 | | 97 | |
| | 8 | 81 | | 98 | |
| | 4 | 79 | | 99 | |
| | 2 | 69 | | 98 | |
| | 1 | 24 | | 77 | |
| 2,4-Dichloro-6-(3,4-dichloroanilino)-trimesonitrile | 1000 | 100 | | 100 | |
| | 256 | 80 | | 87 | |

EXAMPLE 21

Bactericides

Test formulations are examined for ability to inhibit the colonial growth of *Erwinia amylovora* (E.a.), *Xanthomonas phaseoli* (X.p.), *Staphylococcus aureus* (S.a.), and *Escherechia coli* (E.c.) at various concentrations. The basic test formulation contains 0.125 g. of the test chemical (or 0.125 ml. if a liquid), 4.0 ml. acetone, 2.0 ml. stock emulsifier solution (0.5 percent Triton X–155 in water by volume) and 94.0 ml. distilled water, the concentration of toxicant in this formulation being 1250 parts per million. Lower concentrations of toxicant are obtained by diluting the basic formulation with distilled water.

Two ml. of each formulation is dispensed into a test tube which is then placed into a water bath maintained at 44° C. From a stock preparation (also held at 44° C.), 8 ml. of 20-percent nutrient agar is added to the test tube giving a 1:5 dilution or a final concentration of 250 p.p.m. chemical in the agar. The contents of the test tube are then thoroughly mixed, while still warm, with the aid of a Vortex type mixer and immediately poured into a sterile polystyrene Petri dish (100 × 15 mm.). After the agar in the plate is set, suspensions of each organism are simultaneously streaked onto the surface of the agar. After the plate is inoculated, it is incubated 24 to 48 hours at 30° C., after which time each organism is rated visually for growth inhibition by the candidate chemical. Estimates of percent growth inhibition are relative to growth of streak colonies in control plates obtained during individual tests. Using this procedure, the following results are obtained:

| Compound | Concentration (p.p.m.) | E.a. | X.p. | S.a. | E.c. |
|---|---|---|---|---|---|
| 2,4-Dichloro-6-(o-chloroanilino)-trimesonitrile | 8 | 100 | 50 | 100 | 100 |
| | 4 | 100 | 50 | 100 | 100 |
| | 2 | 100 | 50 | 100 | 100 |
| | 1 | 50 | 50 | 50 | 50 |
| 2,4-Dichloro-6-(p-hydroxyanilino)-trimesonitrile | 64 | 100 | 100 | 100 | 100 |
| | 32 | 100 | 100 | 100 | 100 |
| | 16 | 100 | | 100 | 100 |
| | 8 | 100 | 50 | 100 | 100 |
| 2,4-Dichloro-6-(anilino)-trimesonitrile | 32 | 100 | | | 100 |
| | 16 | 100 | | | 100 |
| | 8 | 100 | | | 100 |
| | 4 | 100 | | | 100 |
| 2,4-Dichloro-6-(p-aminoanilino)-trimesonitrile | 250 | 50 | | 50 | 100 |
| | 128 | 100 | | 50 | 100 |
| | 64 | 50 | | 50 | 100 |
| | 32 | 50 | | 50 | 50 |
| 2,4-Dichloro-6-(m-chloroanilino)-trimesonitrile | 16 | 100 | | | |
| | 8 | 50 | | 100 | |
| | 4 | 50 | | 50 | |
| 2,4-Dichloro-6-(o-hydroxyanilino)-trimesonitrile | 250 | 100 | 100 | 100 | 100 |
| | 128 | 100 | 100 | 100 | |
| | 64 | 100 | 50 | 100 | |
| | 32 | 50 | | | |
| 2,4-Dichloro-6-(o-bromoanilino)-trimesonitrile | 32 | 100 | | 100 | |
| | 16 | 100 | | 100 | |
| | 8 | 50 | | 50 | |
| 2,4-Dichloro-6-(o-ethylanilino)-trimesonitrile | 32 | 100 | | 100 | |
| | 16 | 100 | | | |
| trimesonitrile | 8 | 50 | | 100 | |
| | 16 | 100 | | 100 | |
| 2,4-Dichloro-6-(3-chloro-2-methylanilino)-trimesonitrile | 8 | 50 | | 100 | |
| | 4 | 50 | | 100 | |
| 2,4-Dichloro-6-(3-fluoroanilino)-trimesonitrile | 250 | 100 | | 50 | 100 |
| | 128 | 100 | | 100 | |
| | 64 | 100 | | | |
| 2,4-Dichloro-6-(2,4-difluoroanilino)-trimesonitrile | 250 | 100 | | 100 | 100 |
| | 16 | 100 | | 100 | |
| | 8 | 50 | | 50 | |
| 2,4-Dichloro-6-(2,3-dichloroanilino)-trimesonitrile | 250 | 100 | 100 | 100 | 100 |
| | 32 | 100 | 100 | 100 | |
| | 16 | 100 | 100 | 100 | |
| | 8 | 50 | 50 | 100 | |
| 2,4-Dichloro-6-(3,4-dichloroanilino)-trimesonitrile | 250 | 100 | | 100 | 100 |
| | 16 | 100 | | 100 | |
| | 8 | 50 | | 100 | |
| | 4 | 50 | | 50 | |
| 2,4-Dichloro-6-(2,4-dimethylanilino)-trimesonitrile | 250 | 50 | | 50 | |

EXAMPLE 22

Rusticide Test

This test determines the effective capacity of the test compound as systemic bean rusticides. The host-rust system employed is *Uromyces phaseoli* on *Phaseolus vulgaris* var. Pinto which is tested in 4-inch clay pots. A dosage of 45 ml. of the test formulation, equivalent to 45 mg. of chemical or 64 pounds per acre, is drenched on each pot. This test formulation contains 0.1 g. (or 0.1 ml. if a liquid) of the test chemical, 4.0 ml. acetone, 2.0 ml. stock emulsifier solution (0.5 percent Triton X–155 in water by volume), and 94.0 ml. distilled water. The concentration of toxicant in this formulation is 1,000 parts per million. Lower concentrations of toxicant are obtained by diluting the formulation with distilled water.

24 hours after application of the test chemical, the plants are inoculated by atomizing onto the plant leaves a single aqueous suspension containing the uredospore specie. Subsequently the plants are kept for an overnight incubation period at 60° F. and 100 percent relative humidity. Pustule counts are made 7 to 10 days after inoculation and effective control is reported as percent disease control based upon pustule development in non-treated control plants. Additionally, phytotoxicity of the plants by the test chemical is rated by visual observation on a scale from 0, indicating no plant injury, to 11, indicating plant kill. Using this procedure, the following results are obtained:

| Compound Tested | Dosage lbs./acre | Percent Disease Control |
|---|---|---|
| 2,4-Dichloro-6-(3-trifluoromethylanilino)-trimesonitrile | 64 | 100 |
| 2,4-Dichloro-6-(2,3-dimethylanilino)-trimesonitrile | 64 | 100 |

EXAMPLE 23

Viricide Test

Test formulations are examined for ability to control a host virus system, maize dwarf mosaic virus on Golden Bantam sweet corn. A test formulation containing 0.1 g. of the test chemical (or 0.1 ml. if a liquid), 4.0 ml. acetone, 2.0 ml. stock emulsifier solution (0.5 percent Triton X–155 in water by volume), and 94.0 ml. distilled water is prepared for both the soil drench and foliage spray treatments. The host virus system, maize dwarf mosaic virus on Zea mays var. Golden X Bantam, is cultured in a four-inch clay pot. Virus inoculation is made by carborundum leaf abrasion method prior to treatment.

In the foliage spray application, 33 ml. of the test formulation (1,000 p.p.m.) are sprayed at 40 pounds per square inch air pressure while the plants are being rotated on a turntable in a hood. 24 hours after spraying, in the soil drench treatment, the test formulation is applied at the soil surface of each pot; 45 ml. of the formulation being equivalent to a dosage of the test chemical of 64 pounds per acre. Effective control is determined through visual observation of the presence or absence of viral infection symptoms ten days after inoculation. Using this procedure, the following results are obtained:

| Compound | Dosage lbs./acre | p.p.m. | Percent Control |
|---|---|---|---|
| 2,4-Dichloro-6-(anilino)-trimesonitrile | 64 | 1000 | 100 |
| 2,4-Dichloro-6-(2,3-dichloroanilino)-trimesonitrile | 64 | 1000 | 100 |
| 2,4-Dichloro-6-(3,4-dichloroanilino)-trimesonitrile | 64 | 1000 | 100 |

EXAMPLE 24

Systemic Bactericidal Test

Test formulations are examined for ability to control tomato crown gall (*Pseudomonas phaseolicola*). A test formulation containing 0.24 g. of the test chemical (or 0.24 ml. if a liquid), 4.0 ml. acetone, 2.0 ml. stock emulsifier solution (0.5 percent Triton X-155 in water by volume), and 94.0 ml. distilled water is prepared for both the soil drench and foliage spray treatments. Individual tomato plants, var. Rutgers, are planted in 3 ½inch clay pots and are 3 to 5 inches tall at treatment time. Stem puncture inoculation, at the cotylodonary node, with a cellular suspension of the *Pseudomonas phaseolicola* is made one to two hours prior to the soil drench and foliage spray treatment.

In the soil drench treatment, the test formulation is applied at the soil surface of each pot; 17.5 ml. of the formulation being equivalent to a dosage of the test chemical of 64 lbs. per acre. Control is determined through visual observation of tumor formation 10 to 14 days after treatment. Using this procedure, the following results are obtained:

| Compound | Dosage lbs./acre | Percent Control |
|---|---|---|
| 2,4-Dichloro-6-(o-bromo-anilino)-trimesonitrile | 64 | 100 |
| 2,4-Dichloro-6-(o-ethyl-anilino)-trimesonitrile | 64 | 100 |
| 2,4-Dichloro-6-(2,4-difluoro-anilino)-trimesonitrile | 64 | 100 |
| 2,4-Dichloro-6-(3,4-dimethoxy-anilino)-trimesonitrile | 64 | 100 |

It is to be understood that the invention is not limited by the specific examples and embodiments described hereinabove, but includes such changes and modifications as may be apparent to one skilled in the art upon reading the appended claims.

What is claimed is:

1. A method of regulating pests on plants which comprises applying to said pests selected from the group consisting of fungi, viruses and bacteria with a pesticidally effective amount of a composition of matter of the structural formula

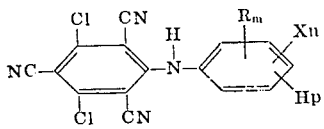

where R is a methyl, ethyl, trifluoromethyl, methoxy, nitro, cyano and hydroxyl group, X is a chloro, bromo, fluoro and iodo group, and H is hydrogen with $m$ and $n$ being from 0 to 3, $p$ from 2 to 5, and the sum of $m$, $n$, and $p$ being 5 with the proviso that when methyl and chloro groups are both present, $m$ is 1 and $n$ is 1 or 2 and when methyl and nitro groups are both present, $m$ is 2 and $n$ is 0.

2. The method of claim 1 wherein the pests are fungi and the compounds are 2,4-dichloro-6-(o-chloroanilino)-trimesonitrile; 2,4-dichloro-6-(p-hydroxyanilino)-trimesonitrile; 2,4-dichloro-6-(anilino)-bromoanilino)-trimesonitrile; 2,4-dichloro-6-(p-aminoanilino)-trimesonitrile; 2,4-dichloro-6-(m-chloroanilino)-trimesonitrile; 2,4-dichloro-6-(p-chloroanilino)-trimesonitrile; 2,4-dichloro-6-(3-chloro-2-methylanilino)-trimesonitrile; 2,4-dichloro-6-(2,4-difluoroanilino)-trimesonitrile; 2,4-dichloro-6-(2,3-dichloro-anilino)-trimesonitrile; 2,4-dichloro-6-(3,4-dichloroanilino)-trimesonitrile; 2,4-dichloro-6-(3-trifluoromethylanilino)-trimesonitrile or 2,4-dichloro-6-(2,3-dimethylanilino)-trimesonitrile.

3. The method of claim 1 wherein the pests are bacteria and the compounds are 2,4-dichloro-6-(o-chloroanilino)-trimesonitrile; 2,4-dichloro-6-(p-hydroxyanilino)-trimesonitrile; 2,4-dichloro-6-(anilino)-trimesonitrile; 2,4-dichloro-6-(p-aminoanilino)-trimesonitrile; 2,4-dichloro-6-(m-chloroanilino)-trimesonitrile; 2,4-dichloro-6-(o-hydroxyanilino)-trimesonitrile; 2,4-dichloro-6-(o-bromoanilino)-trimesonitrile; 2,4-dichloro-6-(o-ethylanilino)-trimesonitrile; 2,4-dichloro-6-(3-chloro-2-methylanilino)-trimesonitrile; 2,4-dichloro-6-(3-fluoroanilino)-trimesonitrile; 2,4dichloro-6-(2,4-difluoroanilino)-trimesonitrile; 2,4-dichloro-6-(2,3-dichloroanilino)-trimesonitrile; 2,4-dichloro-6-(3,4-dichloroanilino)-trimesonitrile; 2,4-dichloro-6-(2,4-dimethylanilino)-trimesonitrile or 2,4-dichloro-6-(3,4-dimethoxyanilino)-trimesonitrile.

4. The method of claim 1 wherein the pests are viruses and the compounds are 2,4-dichloro-6-(anilino)-trimesonitrile; 2,4-dichloro-6-(2,3-dichloroanilino)-trimesonitrile or 2,4-dichloro-6-(3,4-dichloroanilino)-trimesonitrile.

* * * * *

UNITED STATES PATENT OFFICE
CERTIFICATE OF CORRECTION

Patent No. 3,719,765        Dated March 6, 1973

Inventor(s) Robert D. Battershell

It is certified that error appears in the above-identified patent and that said Letters Patent are hereby corrected as shown below:

Column 3, line 1, "2,4-Dichloro-6-(o-hydroxyanilion)-Trimeso-nitrile" should read --2,4-Dichloro-6-(o-hydroxyanilino)-Trimesonitrile --

Column 3, lines 40-45, that portion of the formula reading

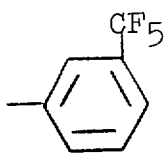    should read    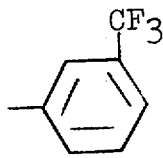

Column 3, lines 65-72, that portion of formula reading

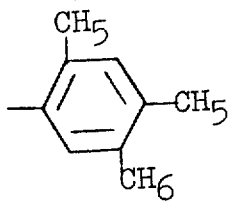    should read    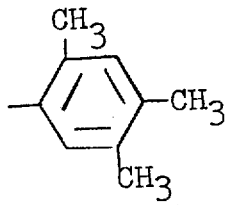

Column 4, lines 1-8, that portion of formula reading

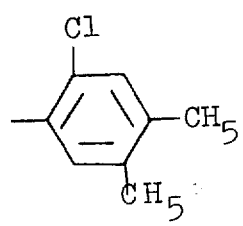    should read    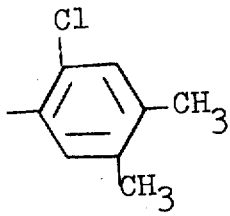

Column 4, lines 8-14, that portion of the formula reading

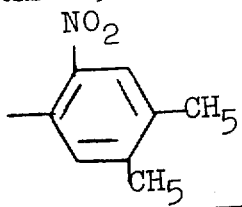    should read    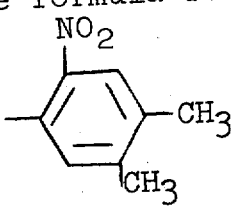

(continued)

UNITED STATES PATENT OFFICE
CERTIFICATE OF CORRECTION

Patent No. 3,719,765     Dated March 6, 1973

Inventor(s) Robert D. Battershell

It is certified that error appears in the above-identified patent and that said Letters Patent are hereby corrected as shown below:

Column 4, lines 15-20, that portion of the formula reading

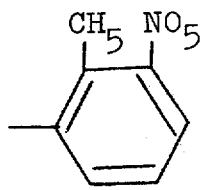     should read     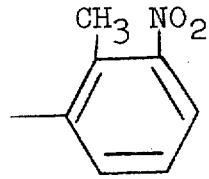

Columns 7 and 8, Table 1, under subheading "Reactants", second line, change "dimethylanilino" to --dimethylaniline--.

Signed and sealed this 9th day of October 1973.

(SEAL)
Attest:

EDWARD M. FLETCHER, JR.
Attesting Officer

RENE D. TEGTMEYER
Acting Commissioner of Patents